July 23, 1935. E. BREWER 2,009,337

SYNCHRONIZED SOUND AND ACTION REPRODUCTION

Filed Sept. 28, 1933 7 Sheets-Sheet 1

Inventor,
Elliott Brewer,
by J. Stuart Freeman,
Attorney.

July 23, 1935.  E. BREWER  2,009,337
SYNCHRONIZED SOUND AND ACTION REPRODUCTION
Filed Sept. 28, 1933   7 Sheets-Sheet 2

Inventor,
Elliott Brewer,
by J. Stuart Freeman,
Attorney.

July 23, 1935.  E. BREWER  2,009,337
SYNCHRONIZED SOUND AND ACTION REPRODUCTION
Filed Sept. 28, 1933  7 Sheets-Sheet 3

Inventor,
Elliott Brewer,
by J. Stuart Freeman,
Attorney.

July 23, 1935.  E. BREWER  2,009,337
SYNCHRONIZED SOUND AND ACTION REPRODUCTION
Filed Sept. 28, 1933  7 Sheets-Sheet 4

Inventor,
Elliott Brewer,
by J. Stuart Freeman,
Attorney.

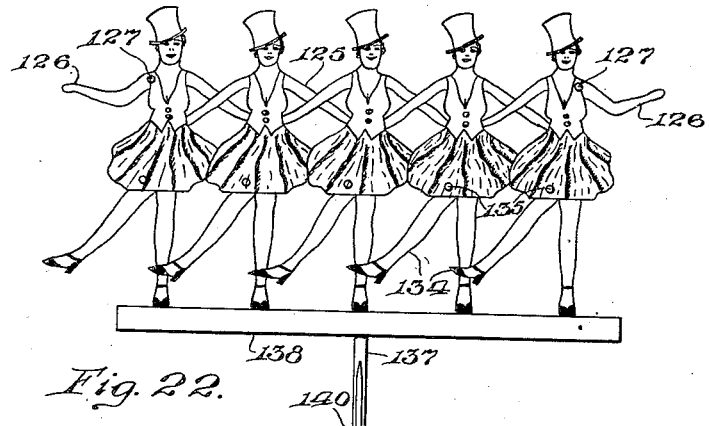
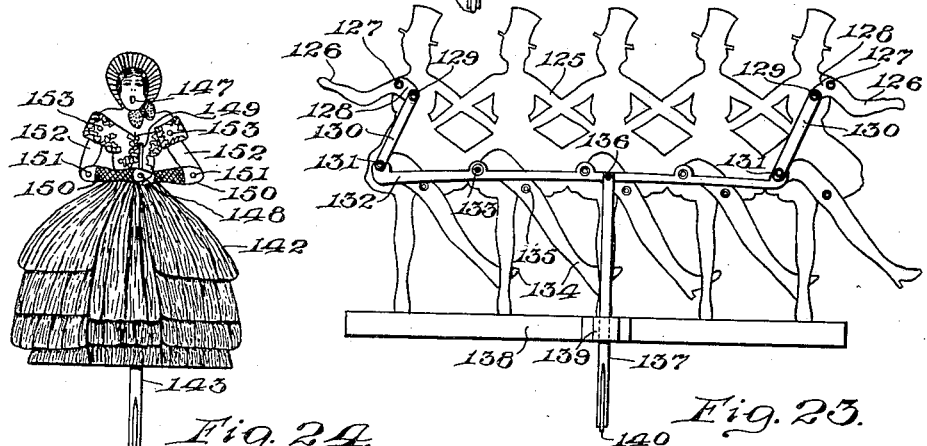
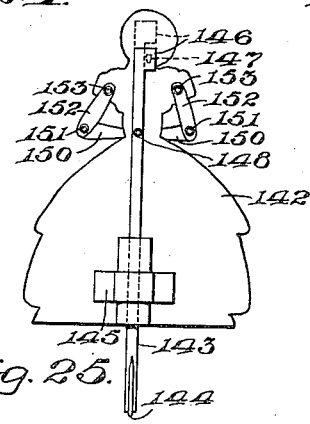

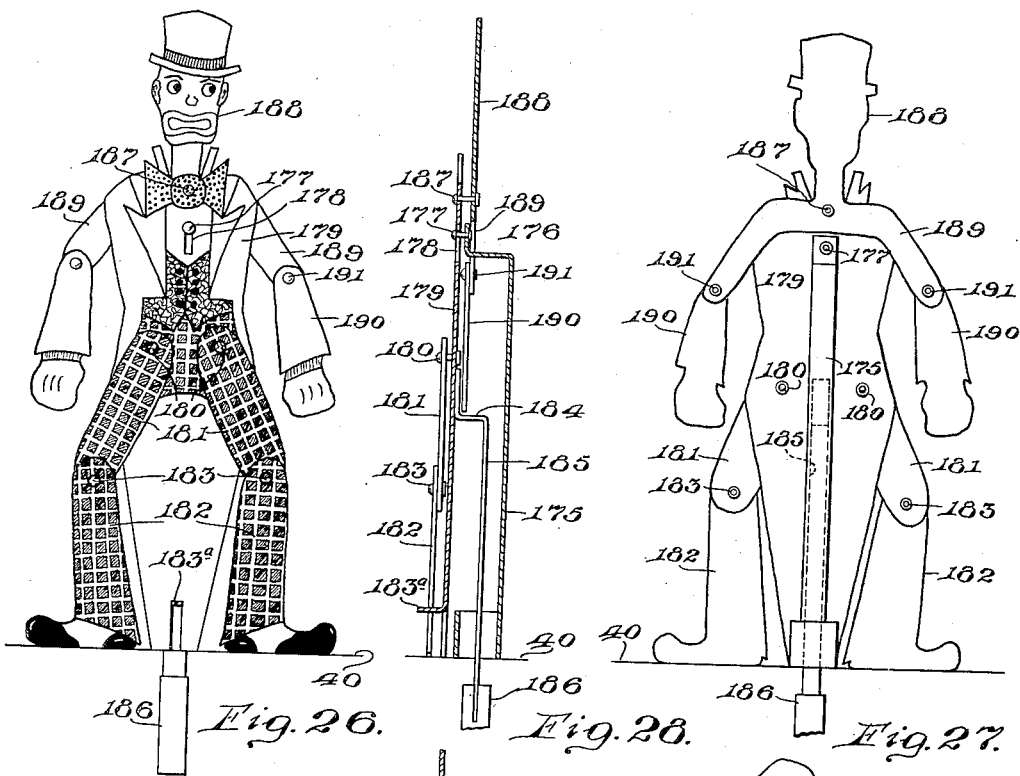
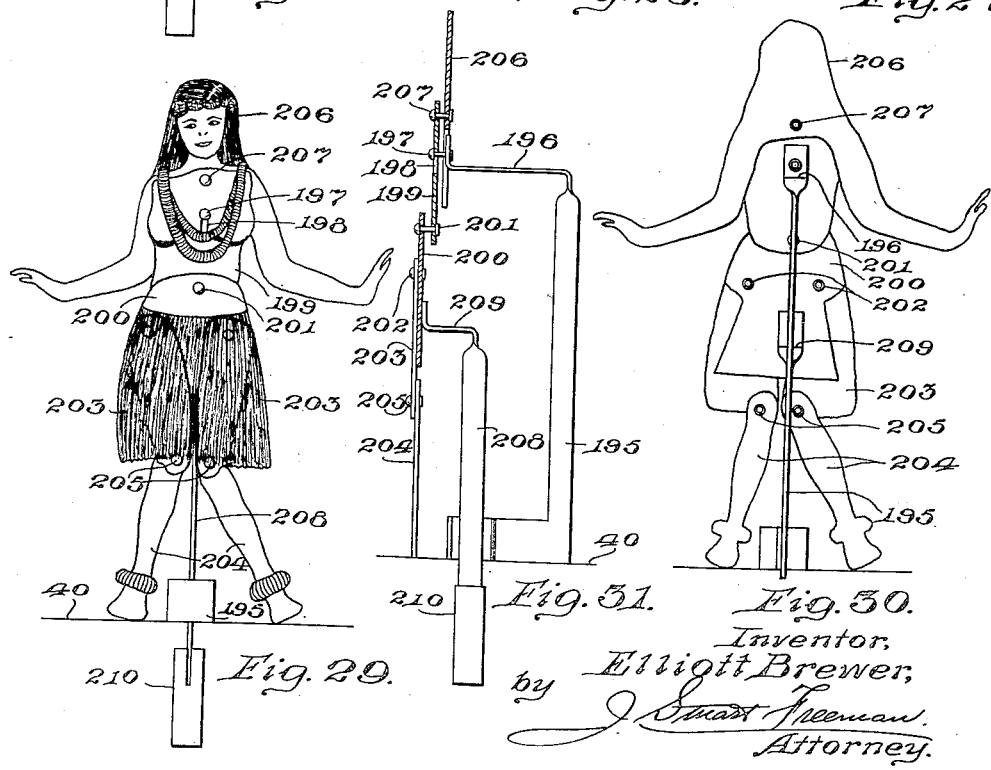

July 23, 1935. E. BREWER 2,009,337
SYNCHRONIZED SOUND AND ACTION REPRODUCTION
Filed Sept. 28, 1933 7 Sheets-Sheet 7

Inventor.
Elliott Brewer,
by J. Stuart Freeman,
Attorney.

Patented July 23, 1935

2,009,337

UNITED STATES PATENT OFFICE 2,009,337

SYNCHRONIZED SOUND AND ACTION REPRODUCTION

Elliott Brewer, St. Davids, Pa.

Application September 28, 1933, Serial No. 691,273

5 Claims. (Cl. 46—49)

The object of the invention is broadly to provide improvements in devices for the reproduction of action, as by automatons, in full synchronism with sound reproduced by radio, by mechanical and electro-mechanical sound-reproducing machines, or otherwise, such automatons or the like and their movements being designed to simulate the appearance and movement of the actors or other characters which they are intended to represent.

While the invention clearly embodies the use of the mechanisms hereinafter described in conjunction with mechanical and electro-mechanical sound reproducing machines, said invention will hereinafter be described as used in conjunction with radio, it being understood that such specific reference is in no way intended to limit the scope of the basic ideas involved.

In the absence of so-called television, or seeing a pictorial representation of the actor, or other source of sound or music, in motion in exact conformity with that of the actual actor or the like, radio reception to-day comprises merely the reproduction of the sound from such actor or other source, and it is becoming widely realized that such sound reproduction must be augmented with as faithful reproduction of the original action as may be possible, in order to sustain the radio's appeal to the public.

Another object therefore is to provide various constructions of automatons, as representative of an infinite number which can be produced, together with means for actuating the same in as realistic a manner as possible, coupled with electrically actuated means to actuate said first means in accordance with the vibrations reproduced by the usual electro-magnetic reproducer, and also if desired with a suitable setting for such reproduced action, such for instance as a portable stage setting or equivalent "atmosphere".

A further object more specifically is to provide improvements in electro-magnetic devices, including solenoids, for the actuation of the automatons, together with improved means for electrically connecting the same into the operating circuits of the mechanism as a whole, said connecting means also being adapted to perform the function of a means for shifting the automatons into and out of operative position with respect to a given setting, without the manipulator being seen in the operation.

Still another object is to provide improved electrical circuits for the operation of the invention in the most efficient and inexpensive manner, and with a minimum degree of lost motion or motions which differ materially from that of the action in the first instance.

With these and still further objects in mind, the invention comprises further details of construction and operation, which are hereinafter fully brought out in the following description, when read in conjunction with the accompanying drawings, in which Fig. 1 is a front elevation of a stage setting to illustrate one type of setting which may be used;

Fig. 22 is a front elevation of an automaton representing the concerted team action of a group of chorus girls;

Fig. 23 is a rear elevation of the same;

Fig. 24 is a front elevation of an automaton representing a vocal singer;

Fig. 25 is a rear elevation of the same;

Fig. 26 is a front elevation of an automaton representing a male dancer;

Fig. 27 is a rear elevation of the same;

Fig. 28 is a central vertical section of the same;

Fig. 29 is a front elevational view of an automaton representing a so-called "hula" dancer;

Fig. 30 is a rear elevation of the same;

Fig. 31 is a central vertical section of the same;

Figure 1:
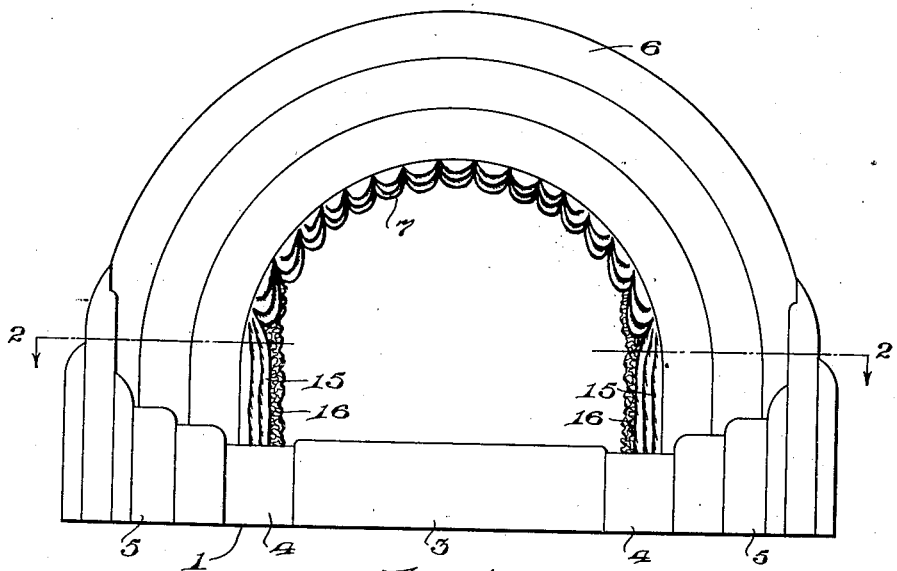
Figure 2:
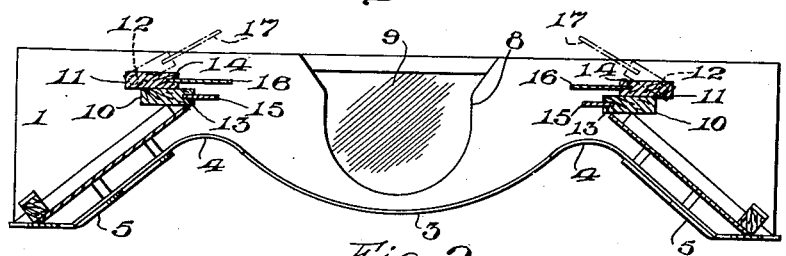
Fig. 2 is a horizontal section on the line 2—2 of Fig. 1.
Figure 3:
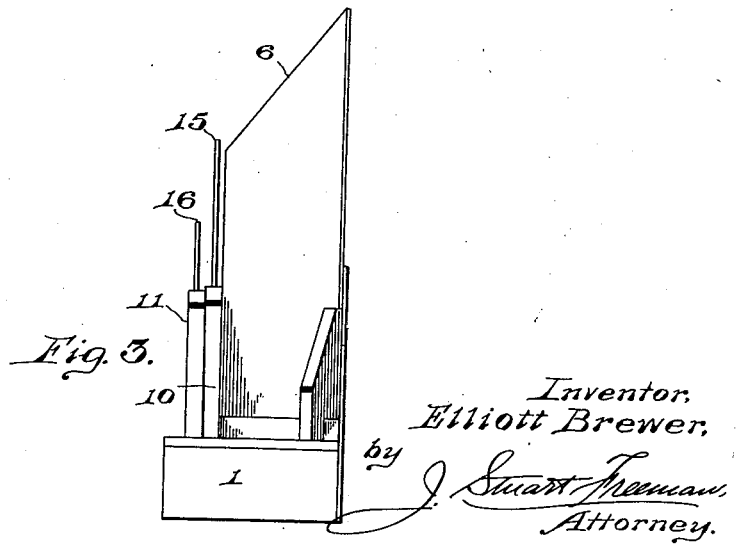
Fig. 3 is an elevation of the setting of Fig. 1.
Figures 4, 5:
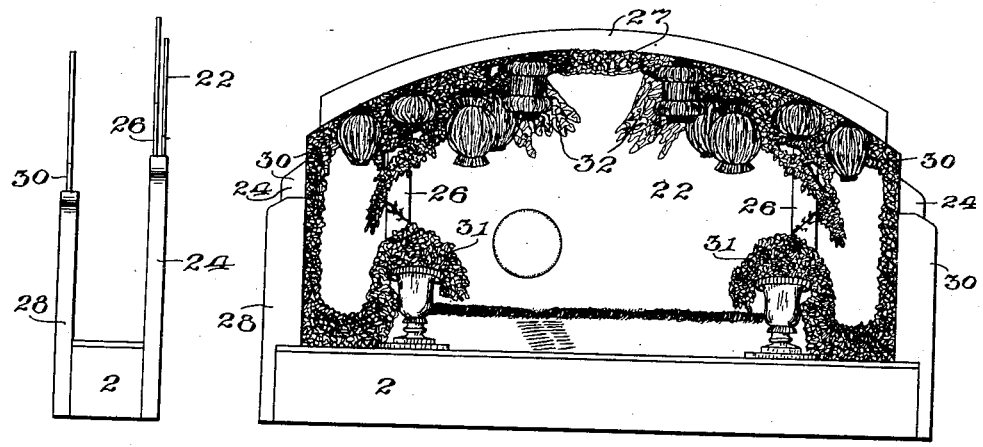
Fig. 4 is a front elevation of a simple form of background, representing the equivalent of a theatrical backdrop, which may be used in combination with the setting of Fig. 1.
Fig. 5 is a side elevation of the same.
Figure 6:
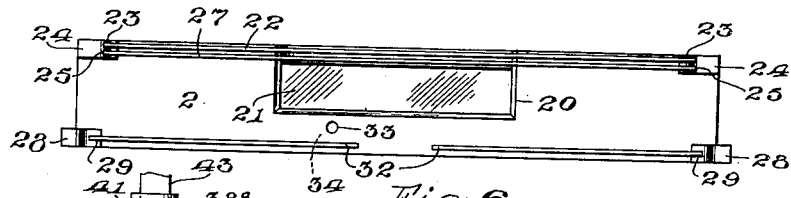
Fig. 6 is a top plan view of the same.

Referring to Figs. 1 to 17 inclusive, a representative form of stage or similar setting is shown as comprising forward and rear elements, characterized by bases 1 and 2, which elements are in practice designed to be positioned one in front of the other to provide an intervening space, for a purpose hereinafter described. The forward surface of the base 1 may be shaped in horizontal cross-section, so as to provide a central forwardly extending convex portion 3, representing the corresponding portion of the usual theatrical stage, and in opposite directions merging into recessed portions 4, and thence into diagonally forwardly extending wings 5. Said central and wing portions may be decorated in any desired manner, while above said wings rise the laterally opposite sides of the inverted U-shaped portion 6, which represents the procenium arch which surmounts the usual theatrical stage, and from which apparently hangs the representation 7 of a draped curtain. The upper surface of the base 1 is preferably interrupted by a recess 8, spanned by any desired arrangement or combination of clear or colored transparent material 9, thru which shine upwardly and rearwardly the rays from otherwise hidden lamps (not visible) within said recess. Slightly to the rear of each of the wings 5 and extending upwardly from the said base, are fixed and movable standards 10 and 11, the latter being pivotally mounted upon a vertical axis 12, while they are provided with vertically extending slots 13 and 14, respectively. The draped curtain 7 above referred to is in reality a substantially semi-circular decorated member of cardboard or the like, the laterally opposite legs 15 of which are slidably positioned within the slots 13 of the forward pair of standards 10, while positioned in the slots 14 of the rearward standards 11 are upright decorated elements 16 representing lateral settings and adapted to be oscillated into angularly directed positions, as for instance those represented by the dot-and-dash lines 17. As hereinbefore stated, this construction is intended to represent any given stage structure and appearance, and may be varied in an infinite number of ways as desired.

Normally spaced to the rear of the base 1 is the base 2, having a recess 20 spanned by any desired arrangement or combination of clear or colored transparent material 21, within said recess there being any desired number or type of lamp or lamps (not visible) for illuminating the forwardly directed surface of a "back drop" 22, comprising a cardboard or similar plaque which is vertically slidably within, and is operatively supported by the sides of, slots 23 in the adjacent faces of a pair of upwardly extending posts 24, respectively secured to the laterally opposite rear portions of said base 2. Said posts are also provided with one or more additional slots 25 in which are also slidably positioned the laterally opposite portions 26 of a decorative element, which also comprises a central section 27 connecting said lateral portions. The rays of light from within the recess 20 normally shine upwardly and rearwardly upon said back drop 22 and the said decorative element 26—27. From the forward laterally opposite portions of said base 2, additional posts 28 extend, such posts having slots 29 in which are slidably positioned the laterally outer portions 30 of scenic elements, which if desired may also comprise inwardly extending portions 31, representing urns or other suitable objects, and overhanging portions 32, representing trees and branches of the same, in position forwardly of the back drop and decorative element 26—27. Said rear base 2 also is provided with an aperture 33 for a purpose hereinafter described, while within said base beneath said aperture is a solenoid similar to that shown in Fig. 11, or an electro-magnet as the case may be, as hereinafter described.

Figure 11:
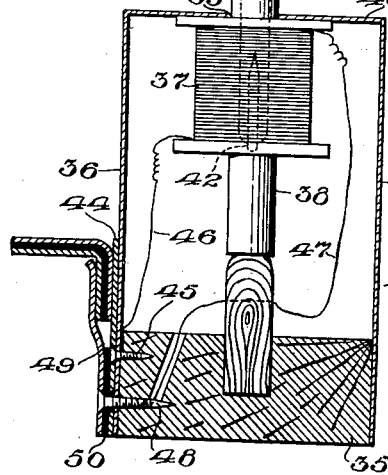
Fig. 11 is a central vertical section of the same in operative relation with one of the combined shifting and electrical contact elements.
Figure 10:
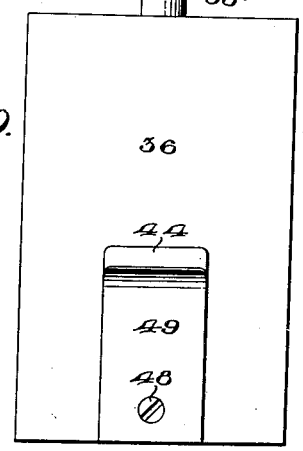
Fig. 10 is a side elevation of a support for the automatons interchangeably.
Figure 12:
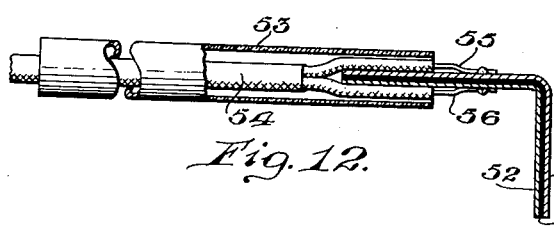
Fig. 12 is a fragmentary sectional view of one of said elements per se.

Referring specifically to Figs. 10, 11 and 12, there is here shown an automaton support, comprising a base member 35 from the lateral peripheral sides of which rise walls 36, surrounding a space within which is positioned a solenoid (or electro-magnet) 37, carried by a standard 38 which is in turn supported by said base member in any suitable manner. Said solenoid may be of any desired construction, but in the present instance is shown as comprising a tubular core 38$^a$, which extends upwardly thru an aperture 39 in the top wall 40, which wall connects the upper portions of said side walls and incloses the space containing the solenoid, while said core provides an axial bore 41 within which is adapted to oscillate the armature 42, carried by a rod 43 which directly actuates the automatons, as hereinafter described.

The side walls 36 and top 40 are preferably formed of insulation material, while against one of said walls is positioned a contact plate 44, secured by a screw or other suitable means 45 to said base 35, and connected by means of a wire 46 to the solenoid 37. The opposite end of the coil of said solenoid is connected by means of a wire 47, and a screw 48, or other suitable attaching means, with a second and preferably resilient contact member 49, said contact members being separated from each other by suitable insulating means 50, and their free end portions being spaced apart, so as to receive terminal contact members 51 and 52, which form angularly downwardly directed terminal portions of an automaton shifting device.

Figure 18:
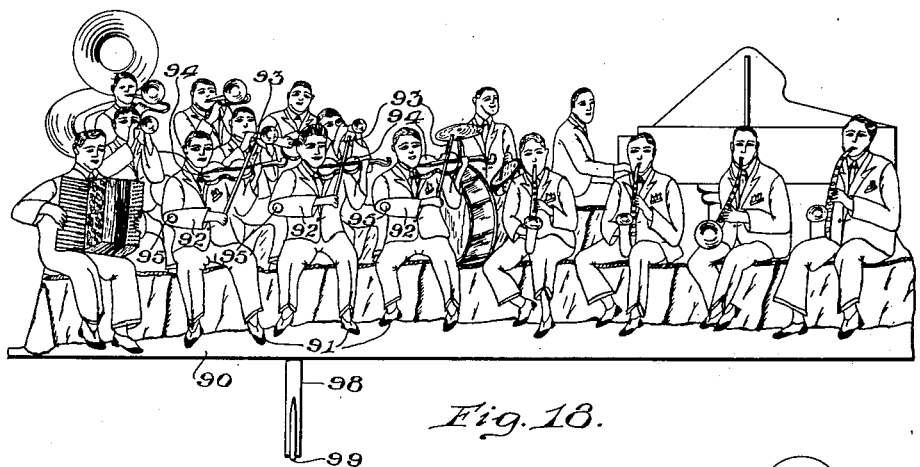
Fig. 18 is an elevational view of an automaton representing an orchestra ensemble.
Figure 19:
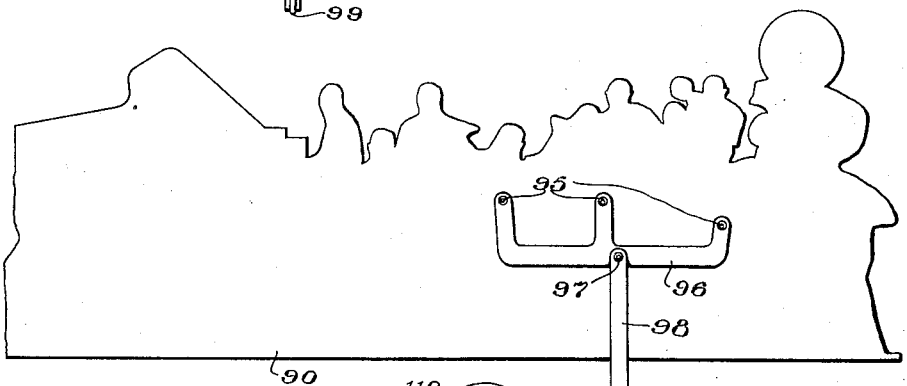
Fig. 19 is a rear elevation of the same.

This shifting device preferably comprises a hollow tube 53 of any desired length, thru which extends the duplex conductor cord 54, the two wires 55 and 56 of which are secured at suitable points to the respective contact members 51 and 52, which latter are spaced apart by a suitable insulating medium 57, and said contact members and intervening insulation as a unit extending into and being fixed with respect to the free end portion of the tube 53. With this construction the terminal portion of said shifting device may be inserted between the contact members 44 and 49 of the automaton support, as shown in Fig. 11, or may be removed therefrom at will. When in operative relation, it is obvious that by means of said shifting device, said support and any automaton carried thereby can be readily shifted laterally into position between the forward and rear bases 1 and 2 of the stage replica, and also into view thru the arch of Fig. 1 or out of view laterally thereof. At this point it should be mentioned that the aperture 33 in the base 2 is positioned above a solenoid which may be similar to that hereinbefore described, and indicated by the dotted line 34, for actuation of said automaton as that hereinafter described, and as illustrated in Figs. 18 and 19.

Referring to Figs. 13 to 17 inclusive, a modified form of automaton base and shifting means is here shown as comprising a partially hollow base 60, containing a solenoid indicated by the dotted line 61 axially disposed with respect to the aperture 62, which extends thru the upper wall of said base, the terminal wires from said solenoid being connected to the base portions 63 of electric contact members, which comprise upwardly and thence reversely downwardly converging resilient terminal contact portions 64, which in turn project into the recess 65, extending downwardly into said base from the uppermost surface thereof. Said axial groove 66, extending longitudinally thru the upper portion of said base, is adapted to rotatably receive a cylindrical tube 67 of a modified form of shifting device. Thru this tube, which may be of any desired length, extends a duplex electric cord 68, the ends of the wires of which (not shown specifically) are normally connected to the radially inner end portions 69 of nails or brads, which extend radially outwardly thru a circular disc head 70, secured to the free end of the tube 67, so that the heads 71 of said nails or brads may come in contact with the terminal contact portions 64, upon rotating the shifting device in either direction from neutral position shown in Fig. 13, where said nails or brads are free of electrical contact with said contact members. With a device of this character, when an automaton base together with its particular automaton is operatively positioned within the stage setting, said automaton may be set into motion in synchronism with the electric reproduction from the radio loud speaker, as hereinafter described, by merely turning said shifting device as above mentioned, while said automaton and its base may be shifted into such operative position, or laterally away from such position, either while said automaton is in operation or idle, by merely moving said shifting device to and fro while the head 70 thereof is positioned within the recess 65 of said modified form of base.

Figure 7:
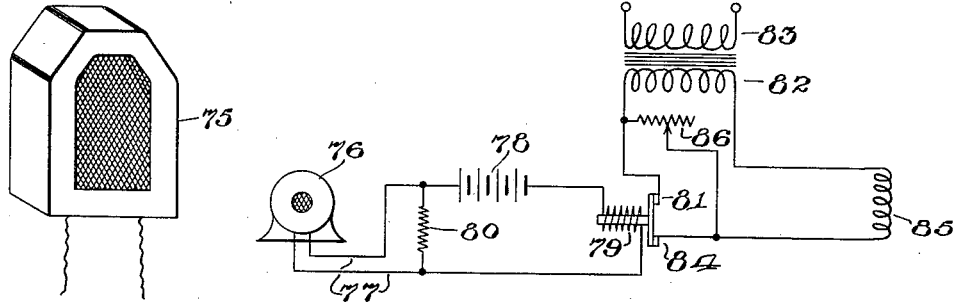
Fig. 7 is a diagrammatic view of one form of the electric circuit employed to actuate the device, and the microphone of said circuit positioned in operative relation to a so-called loud speaker of an ordinary radio set.

Referring to Fig. 7, there is here shown a diagrammatic system of wiring for energizing the solenoid hereinbefore described, or as many such solenoids as may be desired. This system of wiring presupposes that a radio loud speaker 75 is electrically connected to a radio receiving circuit in accordance with accepted practice, so that the said loud speaker accurately reproduces the sound produced by the broadcaster, wherever he may be. Connected either in parallel with said loud speaker, or thru a suitable switch 76 actuated by non-electric vibratory means and in effectively close proximity to said loud speaker, is a pair of wires 77, which in turn are connected to a battery 78 and a double contact relay 79, a suitable impedance coil 80 being connected across said wires 77.

One of the contacts 81 of said relay is connected through the secondary coil 82 of a transformer which has its primary coil 83 connected to a suitable source of alternating current, such for instance as the lighting circuit of the average residence or office, while the opposite side of said secondary coil and the other of the relay contacts 84 are connected to the opposite ends of the solenoid coil 85, either directly, or thru the medium of an intervening shifting device, such as those hereinbefore described. A variable resistance 86, if desired, may also be connected across said relay contacts 81 and 84, in order to absorb any desired operation of the potential produced in said transformer secondary. With this construction and wiring arrangement, the sound vibrations produced by the loud speaker 75, even before reaching the listener positioned before said loud speaker and viewing of the automaton, in association with or separate from said stage setting, reach and impinge against the said switch 76, thereby sending current from the battery 78 thru the relay coil 79 and intermittently bridging contacts 81 and 84, so as to intermittently energize the solenoid coil 85, and operate the automation as hereinafter described.

In practice it has been found that by carefully adjusting the various elements involved, the operation of the automaton will be in minute accord with the sounds emitted by said loud speaker, as the latter reach the operator, the distance between the operator and the loud speaker with consequent lag in sound transmission being sufficient to correspond with the slight lag in time, due to the distance between the loud speaker and the said vibration actuated switch 76, the slight time loss in the operation and the relay, and the even more abbreviated time loss in the automaton itself.

Having thus described the mechanism by which the various types of automatons are operated in synchronism, and indirectly by the audible vibrations emitted by a radio loud speaker, talking machine, or other source of sound, even to the original speaker or singer direct, the construction of several types of automaton construction will now be considered.

Referring to Figs. 18 and 19, a plaque 90 is here shown as being so decorated and shaped as to represent an orchestra of several musicians, including three violinists 91 as representative of all of the musicians which can equally well be animated. Each of these violinists has an arm 92, which is separate from said plaque, but provided with an extension 93, representing a bow in operative relation to a violin 94, said arms being pivotally carried by pins 95, which extend thru said plaque and upon their opposite ends are connected to a common lever 96 of suitable shape, which lever is in turn connected thru a pivot 97 with a reciprocatory member 98, in turn provided with an iron armature 99, adapted to normally enter the aperture 33 and the solenoid 34 thereбеneath, when the plaque rests directly upon the rear stage base 2. Thus, as said solenoid is intermittently energized with varying degrees of current value, in accordance with varying intensities of the sound emitted by said loud speaker, or the like, the bow arms of the said violinists reciprocate to and fro to all intents and purposes in exact synchronism with the said sounds, and therefore in synchronism with the movements of the original actors in the broadcasting orchestra itself. This orchestra plaque it is obvious can be placed upon or removed from association with said solenoid and said stage setting at will, so that it is only present in operative position as long as orchestral music is being received by said loud speaker, or being produced by a talking machine, or the like.

Figures 20, 21:
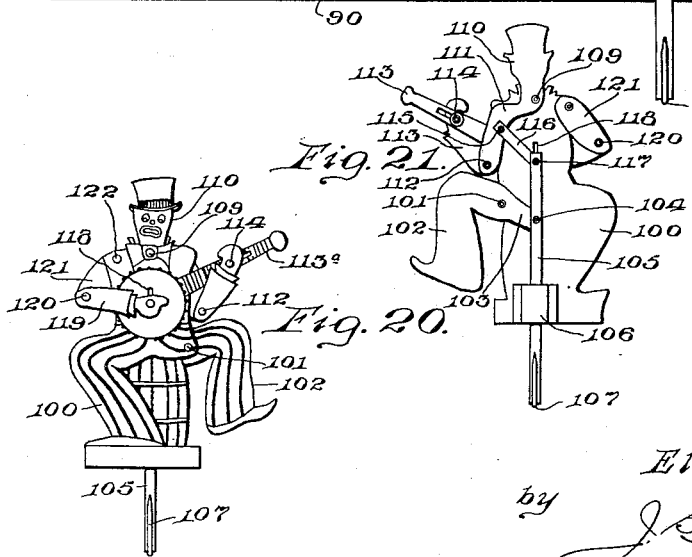
Fig. 20 is a front elevation of an automaton representing a banjo player.
Fig. 21 is a rear elevation of the same.
Figure 32:
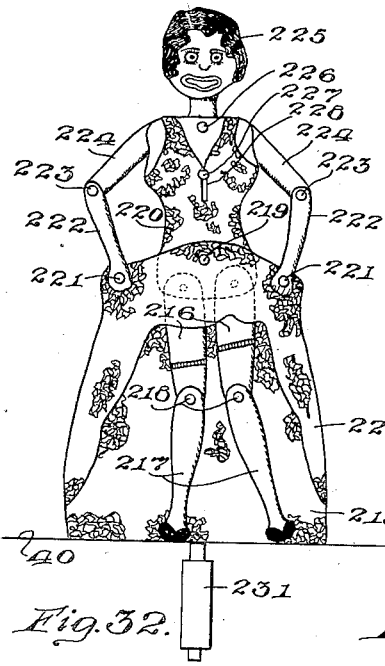
Fig. 32 is a front elevational view of a female dancer.
Figure 34:
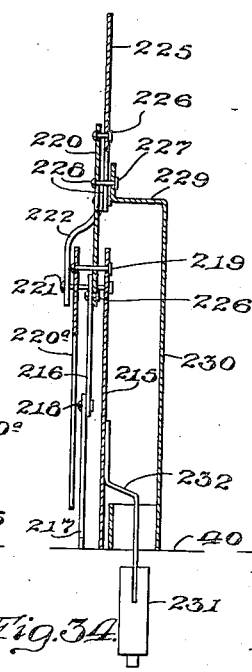
Fig. 34 is a central vertical section of the same.
Figure 33:
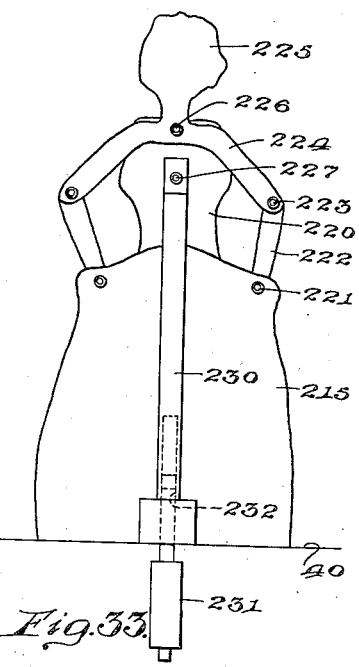
Fig. 33 is a rear elevation of the same.

Referring to Figs. 20 and 21, there is here shown an automaton representing a banjo player, and comprising a body portion 100 to which is pivotally secured at 101 a lever, comprising one arm 102 which upon its forward face is decorated to represent one leg of the actor, the other lever arm 103 being connected by means of a pivot 104 to a reciprocatory member 105, which in turn is attached to the rear surface of said automaton player or actor by means of a strap 106, and carried upon its free end portion an iron solenoid 107, adapted to enter the solenoid 34 or more especially a solenoid mounting of the type shown in Figs. 10 and 11, so that the automaton can be shifted into and out of operative relation with respect to the stage setting by means of either type of shifting devices hereinbefore described. In this case, there is pivotally secured to said body portion 109 a lever comprising an arm 110, which upon its normally forward surface is decorated to represent the head of the actor, while the other lever arm 111 is made to represent the upper arm of the actor, there being pivotally secured thereto at the "elbow" 112 a "forearm" extension 113, which slidably engages the "banjo" representation 113ª thru the medium of a pivot 114. The lever arm 111 is pivotally connected at 115 with a link 116, which is in turn connected thru a pivot 117 to the adjacent portion of the reciprocatory member 105. Said last-named pivot also extends slidably thru a slot 118 in said body portion of the automaton, and connects with a "hand" and "forearm" unit 119, the opposite end of which unit is connected by means of a pivot 120 with a second upper arm 121, pivotally supported at the "shoulder" by means of a pivot 122. By means of this construction, reciprocation of the member 105 causes no less than four quasi-natural movements of the automaton actor to take place, namely, movement of one leg, the head, one arm with respect to the shaft of the "banjo", and the other arm with respect to the body of the banjo, all in accordance with the natural movements of the original actor when playing a given musical selection.

In the dancing group shown in Figs. 22 and 23, the plaque 125 is shaped in silhouette to represent the bodies of several girls, with one leg and the head of each integral therewith, the oppositely directed arms 126 of the two end girls each comprising one "arm" of a lever, which is pivotally connected at 127 with "shoulder" portions of the said plaque, the other lever arm 128 in each case being connected thru a pivot 129 with a link 130. Each link is pivotally connected at 131 with one of the opposite end portions of a connecting rod 132, to intermediate portions of said rod there being connected thru pivots 133 extensions of levers 134 the forward faces of which are decorated to represent "legs", which are pivotally mounted upon said plaque by means of pivots 135. At 136 said rod is connected also to a reciprocatory member 137, which is slidably secured to the base portion 138 of said plaque by means of a strap 139 or the like, the lower free end portion of said member being provided as in other cases with a suitably shaped iron armature 140, which is adapted to enter and be operatively associated with the solenoid of such an actuating unit as those hereinbefore described.

Figure 8:
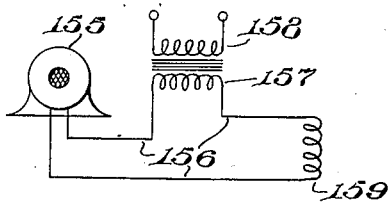
Fig. 8 is a diagrammatic view of another type of circuit.
Figure 9:
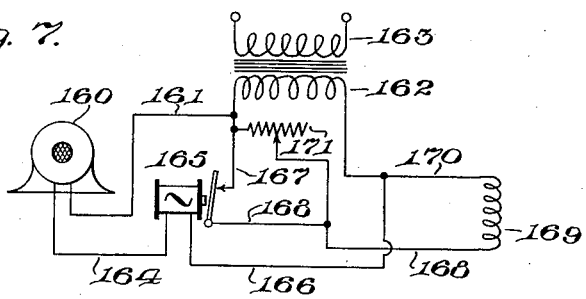
Fig. 9 is a similar view of a still further type of circuit.
Figure 14:
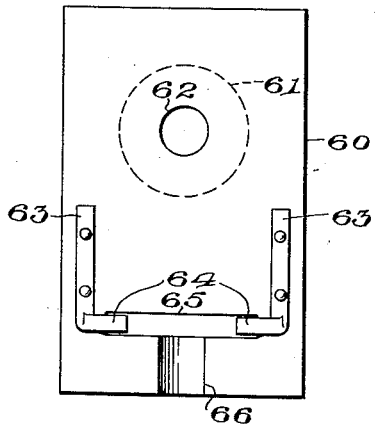
Fig. 14 is a top plan view of the same.
Figure 13:
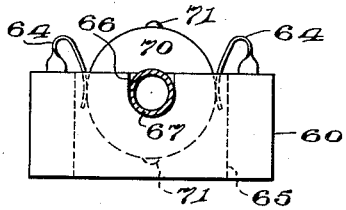
Fig. 13 is a side elevation of a modified form of automaton base.
Figures 16, 17:
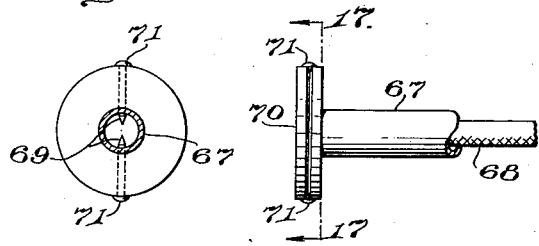
Fig. 16 is a fragmentary elevation of a modified form of combined shifting and contact element.
Fig. 17 is a vertical section on the line 17—17 of Fig. 16.
Figure 15:
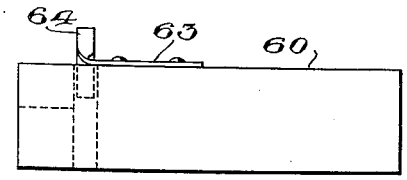
Fig. 15 is a front elevation of the same.

The automaton illustrated in Figs. 24 and 25 represents a vocal singer and comprises a body portion 142, adapted as in previous cases to rest upon a supporting unit, while the lower end of a reciprocatory member 143 and its armature 144 enter an actuating solenoid as hereinbefore described. Said member is slidably secured to said body portion by means of a strap or the like 145, while its upper free end 146 is normally adapted to extend over or free of an aperture 147, to provide the appearance of the intermittent and alternate opening and closing of the mouth of a singer. To an intermediate portion of said member is secured a pivot 148, which extends thru an elongated aperture 149 in said body portion 142 and connects both with and together the "hand-like" terminal portions of links 150, representing "forearms", the opposite ends of said links being pivotally connected as at the "elbows" 151 with the "upper arm" links 152, pivotally carried by pivots 153 at the "shoulders" of the automaton. Reciprocation of the member 143 in this case, under the influence of electric pulsations in the solenoid of the usual supporting unit, causes the "hands" to rise naturally as and in accordance with the opening of the "mouth", or otherwise as may be desired, depending upon the design and relationship of the parts involved. These automatons, as hereinbefore stated, may be actuated by means of an electrical hook-up such as that illustrated in Fig. 7 and hereinbefore described. On the other hand, modified forms of this hook-up may be arranged as shown in Figs. 8 and 9. In the former, Fig. 8, the switch 155 adapted to be actuated by non-electric vibratory means is connected by wires 156 to and thru the secondary winding 157 of a transformer, having a primary winding 158 connected to any suitable source of alternating current, and also to and thru the solenoid 159, which is the same as the solenoid 85 in Fig. 7, and represents the solenoid 37 in Fig. 11. In the hook-up illustrated by Fig. 9 the microphone 160 is connected by a wire 161 to the secondary winding 163, in turn connected to any suitable source of alternating current, the opposite sides of said microphone being connected by a wire 164, to an A. C. relay 165 and thence by a wire 166 to the opposite side of said secondary winding.

The non-electric-vibration-actuated switch side of the secondary winding is connected by a wire 167 thru the relay contact mechanism, and by a wire 168 to one side of the solenoid 169 (equivalent to the solenoids 37, 85 and 159), the opposite end of said solenoid being connected by a wire 170 to the opposite side of said secondary winding 162. A variable choke coil 171 is then connected between the said switch side of the secondary winding and the relay side of said solenoid 169, in order to vary the ratio of the current passing thru said relay contact mechanism and said solenoid.

Returning to the various forms of automatons and to Figs. 26, 27 and 28 in particular, there is here shown an upright supporting member 175, adapted to be detachably mounted upon and supported by the upper wall 40 of a solenoid unit, such as that shown in Fig. 11. The upper end portion of this member is extended angularly at 176 and is provided with a pin 177, which extends thru an upright slot 178 in any suitable part of the body portion 179 of an automaton, such for instance as the representation of a male actor as illustrated. The body portion of this automaton is in a single piece, and to it by means of pivots 180 are connected leg sections 181 and 182, in turn pivotally connected together at 183, the lower free end portions of said leg sections or units being prevented from coming together and overlapping by virtue of the fact that there extends laterally between them an angularly deflected extension 183ª of the lower portion of the body 179. This lower portion of said body, not being colored, is intended to serve as a screen in order to obscure from the audience the mechanism to the rear thereof. To a suitable intermediate portion of the rear surface of the body 179, there is secured in any suitable manner the upper portion 184 of a reciprocatory member 185, the lower portion of which is secured to an armature 186, which is in turn adapted to enter and be vertically reciprocated under the influence of the usual solenoid beneath the supporting wall 40. In this instance the body portion 179, at substantially its uppermost limit has connected to it by means of a pivot 187 a laterally oscillatable head-and-hat (for example) extension 188, from which latter there extends integrally and divergingly downwardly the upper arm sections 189, to which are secured lower arm sections 190 by means of pivots 191. With this construction, oscillation of the actuating member 185 under the control of the guiding pivot 177 provides vertically reciprocatory movement of the body 179, and due to the lack of accurate balance of said head and arms, the units comprising elements 188 and 190 jiggle laterally in a manner representative of an actor when shuffling his feet in a well-known manner, the legs at the same time doing an in-and-out motion of similar character.

Referring to Figs. 29 and 30 and 31, a supporting member 195 is shown, the upper end portion 196 of which is provided with a pivot 197, slidably extending thru an upright slot 198 in the upper section 199 of the body portion of an automaton which also comprises a lower section 200, pivotally connected together by means of a pin 201. To said lower section is pivotally secured by pins 202 the leg units, in turn comprising upper leg sections 203 and lower leg sections 204, pivotally connected together by pins 205. A head-and-arm unit 206 is connected by a pivot 207 to the uppermost portion of the upper body section 199. With this construction, said upper body portion is restrained by the supporting member 195 and pin 197 to move primarily in a substantially vertical path, while the lower body portion 200, is actuated in a similar substantially vertical path by means of the actuating member 208, the upper portion 209 being directly connected to said lower body portion 200, while the lower end portion of said actuating member carries the usual arm joint 210 in normally cooperative relation with the solenoid beneath the supporting surface 40, as hereinbefore described. Having in mind therefore that the lower body portion 200 is oscillated substantially vertically, but without the path of the member 208 being guided, other than by the supporting member 195, the motion of the upper body portion 199, with the weight of the head-and-arm element 206 being carried by the uppermost portion of the body section, and the resulting actions of the automaton as a whole are very remarkably similar in nature to that of the so-called hula girl.

Referring to Figs. 32 to 37 inclusive, there is here shown an automaton representing a different type of dancer, primarily comprising a widened lower portion 215 representing a skirt, a portion of which is cut away to make visible the upper leg sections 216 and the lower leg sections 217 connected together by pivot pins 213. Said skirt portion is pivotally connected to a secondary forwardly positioned skirt section 220ª, and it will be noted that the rear skirt section 215 and the auxiliary or forward skirt section 220ª are spaced apart but are unitarily connected thru pivots 219 and 211. The laterally opposite upper portions of said skirt sections are then connected by pivots 211 to the lower arm sections 222, in turn pivotally connected at 223 to upper arm sections 224, which in turn comprise integral forwardly and laterally extending projections of a head section 225, which is pivotally connected at 226 to the uppermost portion of said body section 220. Connected to the body section 220 by means of a pivot 227, vertically slidable in a slot 228 in said body section, is the upper laterally directed end portion 229 of a supporting member 230, normally carried by the upper surface 40 which is positioned thru the solenoid and adapted to actuate the armature 231, carried by the lower end portion of an actuating member 232, the uppermost portion of which is in turn connected by suitable means to the rear surface of the rear skirt section 215. In the operation of this device, the oscillatory movement of the actuating member 232 moves the skirt 215 in a generally upward and downward path, restrained only thru the pivot connection with the body section 220, in turn under the lateral restraining influence of the pivot 227 carried by the supporting member 230. By connecting the laterally opposite portions of the skirt sections thru links or pivotally connected arm sections to the head element, and thereby to the upper portion of the body section, there is provided the compound action which with surprising faithfulness represents the actions of one form of dancer.

Figure 35:
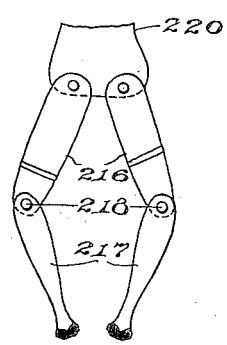
Figs. 35, 36 and 37 are diagrammatic views of as many different positions of the legs of said last-named dancer, which are assumed as the result of the construction here presented.
Figure 36:
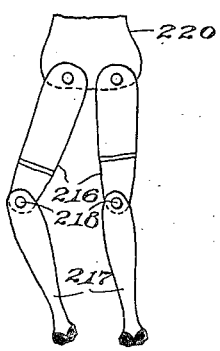
Figure 37:
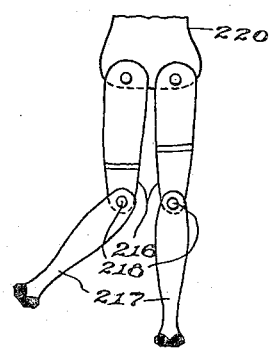

Figs. 35, 36 and 37 are presented to show suggestions of an almost unlimited number of relatively positioned upper and lower leg sections when this form of automaton is in operation. With respect to the automatons thus described, it should be distinctly noted that the transverse thickness of the same from front to rear has been greatly exaggerated in each case, in order to separate the various pivotally connected sections, whereas in practice the several sections are formed of paper or thin cardboard and the pivots are but relatively short members, such as a small type of eyelet in common use for pivotally securing two or more sheets of paper or cardboard members together.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to protect by Leters Patent, is:—

1. The combination of a pick-up device for electric impulses, with a solenoid, a source of current connected to said device and to said solenoid, an automaton, and an armature carried by said automaton, and normally maintained by gravity in spaced relation to one side of the centre of the magnetic field of said solenoid, movement of said armature under the influence of said solenoid in one direction and by gravity in the opposite direction, operating to positively actuate said automaton intermittently to varying degrees in proportion to and in accordance with variations in the impulses received by said device.

2. The combination of a switch actuatable by non-electric vibratory means, with a solenoid, a source of electric current with connections to said switch and said solenoid, an automaton adapted to act in a manner similar, to an original actor, and an armature connected to said automaton, and normally maintained by gravity in spaced relation to one side of the centre of the magnetic field of said solenoid, movement of said armature under the influence of said solenoid in one direction and by gravity in the opposite direction, operating to positively actuate said automaton intermittently to varying degrees in proportion to and in accordance with variations in the impulses received by said device, and thereby in synchronism with sounds produced by said original actor.

3. The combination of a base, a solenoid carried by said base, an automaton also carried by said base, an armature connected to said automaton and normally spaced by gravity to one side of the center of the magnetic field of said solenoid, a source of electric current, and connections whereby said solenoid alternating with gravity positively actuates said automaton intermittently thru said armature in exact synchronism with variations in the current pulsations within the range of certain sound frequencies.

4. The combination of a sectional automaton, with a solenoid, an armature connected to a section of said automaton and normally maintained by gravity in spaced relation with and upon one side of the centre of the magnetic field of said solenoid, to positively actuate said automaton section in accordance with variations in the electric pulsations within said solenoid, a wave-sensitive switch operable within the range of certain sound frequencies, and connections for positively energizing said solenoid in direct accordance with variations in the electric waves received by said switch from an extraneous source.

5. The combination of a sectional automaton, the sections of which are relatively movable and are connected together, with a solenoid, an armature normally maintained by gravity below the centre of the magnetic field of said solenoid, means connecting said armature to a section of said automaton, to positively actuate said connected section, and thereby indirectly actuate the other sections, in accordance with variations in electric pulsations within said solenoid, a wave-sensitive switch operable within the range of certain sound frequencies, and connections for positively energizing said solenoid in direct accordance with variations in the electric waves received by said switch from an extraneous source.

ELLIOTT BREWER.